INVENTOR.
William F. Kyle, Jr.
BY
Flehr and Swain
ATTORNEYS

Nov. 3, 1959 W. F. KYLE, JR 2,911,162

MAGNETIC TAPE APPARATUS

Filed Nov. 8, 1954 5 Sheets-Sheet 2

INVENTOR.
William F. Kyle, Jr.
BY
Fisher & Swain
ATTORNEYS

Nov. 3, 1959

W. F. KYLE, JR 2,911,162

MAGNETIC TAPE APPARATUS

Filed Nov. 8, 1954

5 Sheets-Sheet 3

INVENTOR.
William F. Kyle, Jr.
BY
Flehr & Swain
ATTORNEYS

INVENTOR.
William F. Kyle, Jr.
BY
Flehr and Swain
ATTORNEYS

Nov. 3, 1959 W. F. KYLE, JR 2,911,162

MAGNETIC TAPE APPARATUS

Filed Nov. 8, 1954 5 Sheets-Sheet 5

INVENTOR.
William F. Kyle, Jr.
BY
Flehr & Swain
ATTORNEYS

United States Patent Office
2,911,162
Patented Nov. 3, 1959

2,911,162

MAGNETIC TAPE APPARATUS

William F. Kyle, Jr., Mountain View, Calif., assignor to Ampex Corporation, Redwood City, Calif., a corporation of California Application November 8, 1954, Serial No. 467,617
4 Claims. (Cl. 242—55.12)

This invention relates generally to magnetic tape apparatus of the type employed for recording or reproducing sound or other recordable frequencies.

Conventional apparatus of the above character employ turntables adapted to mount supply and takeup reels. The magnetic tape extending between the reels is frictionally engaged with a driving capstan, and is caused to move in cooperative relation with a magnetic head assembly. Additional driving means is associated with the turntables whereby during a recording or playback operation, the tape is drawn from the supply reel with constant tension, and is wound upon the takeup reel. Also during a rewind operation the tape is moved in a reverse direction and wound upon the supply reel. When a tape is applied to the machine, it is necessary to thread the tape in cooperative relation with the guide means, the magnetic head assembly, and the driving capstan. Likewise, when a tape is removed it must be disengaged from the drive means, the driving capstan and the magnetic head assembly. In many instances, such operations handicap or prevent the use of magnetic tape machines, as for example, where it is important to make quick application or removal of a tape, or where the available operator for the machine may be relatively unskilled.

In general, it is an object of the present invention to provide magnetic tape apparatus which greatly facilitates application and removal of the magnetic tape.

Another object of the invention is to provide apparatus of the above character in which the magnetic tape, together with the supply and takeup reels, are carried by a cartridge or magazine, and in which the tape is brought into cooperative relation with the driving capstan and with a magnetic head assembly, as the magazine is applied to the remaining part of the machine.

Another object of the invention is to provide apparatus of the above character having novel means for making mechanical driving connections between the supply and takeup reels, and other parts of the apparatus.

Another object of the invention is to provide apparatus of the above character having novel and simplified braking means associated with the turntables for the supply and takeup reels.

Another object of the invention is to provide magnetic tape apparatus of the magazine type having novel means for automatically coordinating the rewind of the magazine with the remaining working parts of the machine, as the magazine is placed in proper position upon the machine.

Additional objects and features of the invention will appear from the following description in which the preferred embodiment has been set forth in detail in conjunction with the accompanying drawings.

Referring to the drawings.

Figure 1:
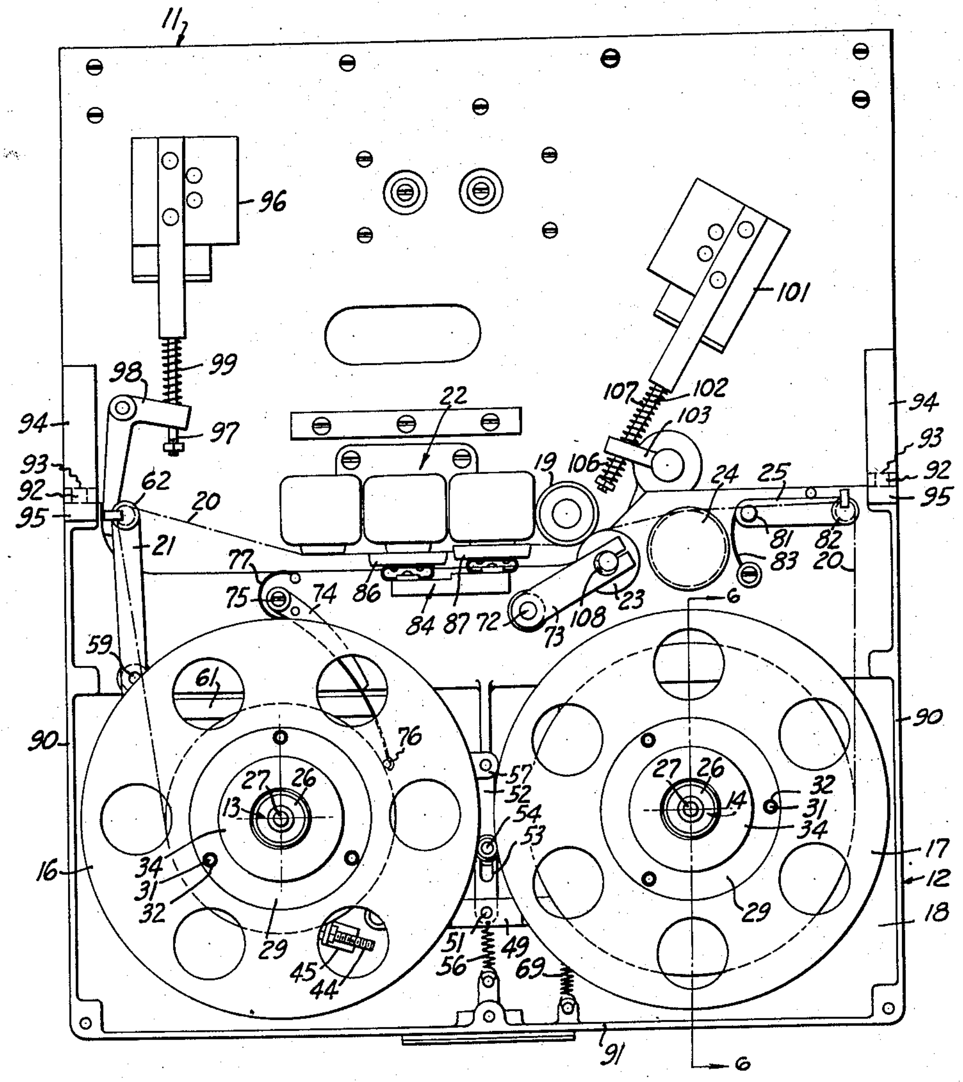
Figure 1 is a plan view of a machine incorporating the present invention, with the top wall of the machine housing and the cover of the magazine receiving space removed, to expose the working parts.

Referring to Figure 1 the apparatus consists of a top mounting plate 11 on which a removable magazine 12 is mounted. This magazine carries a number of working parts, including particularly the turntables 13 and 14, which serve to mount the supply and takeup reels 16 and 17. As will be presently explained, the turntables are rotatably mounted upon the frame or housing 18 of the magazine. The magnetic head assembly, which can consist of erase, record and playback heads, are mounted upon the top plate 11. A tape driving capstan 19 is also rotatably mounted upon the top plate 11, and is driven by means to be presently described.

When the magazine is located in operative position as shown in Figure 1, the tape 20 engages over the free end of the tension arm 21, from which it extends across the head assembly 22, to the driving capstan, where it is urged against the periphery of the capstan by the idler wheel or roller 23. Both the constant tension arm 21 and the idler 23 form a part of the magazine and are mounted on the magazine frame 18. From the driving capstan the tape passes over the tape guide 24, the operating arm 25 of a safety switch, and from thence to the takeup reel 17. The guide 24 and arm 25 are likewise mounted upon the magazine frame.

Figure 6:
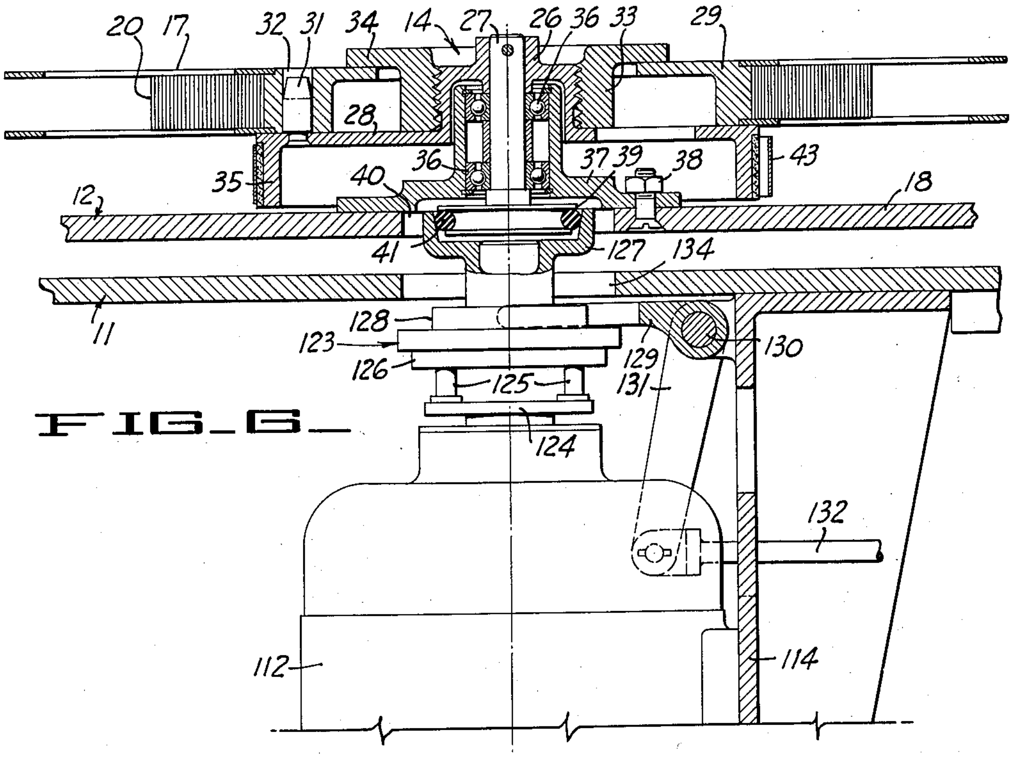
Figure 6 is a cross sectional view taken along the line 6—6 of Figure 1.

The two turntables 13 and 14 can be of similar construction and provided with similar means for rotatably mounting the same upon the magazine frame. Thus the turntable 14 as shown in Figure 6 consists of a hub 26 which is fixed to the shaft 27. The hub is formed with a disk or flange 28 which serves to seat the hub 29 of the reel 17. Locating pins 31 are carried by the flange 28, and engage within openings 32 formed in the reel hub, thus serving to drive the reel as the turntable rotates. A nut 33 has threaded engagement with hub 26, and is provided with a flange 34 for engaging and retaining the hub 29 of the reel. A rim 35 is also formed upon the flange 28, and provides a brake drum. As will be presently explained, the brake drums for the two turntables are engaged by braking elements which in turn connect with special operating means.

Suitable ball bearing assemblies 36 serve to journal the shaft 27 within the journal mounting 37. This journal mounting is secured to the frame 18 of the cartridge as by means of bolts 38.

One end of each shaft 27 is provided with means forming a part of a mechanical drive coupling. Thus a disk or wheel 39 is attached to the shaft 27, and is alined with the opening 40 provided in the adjacent wall of the magazine frame. The periphery of the wheel 39 is provided with a groove adapted to accommodate a resilient drive ring 41. This drive ring can be formed of natural or synthetic rubber, and it may be of the O-ring type as illustrated.

Figure 2:
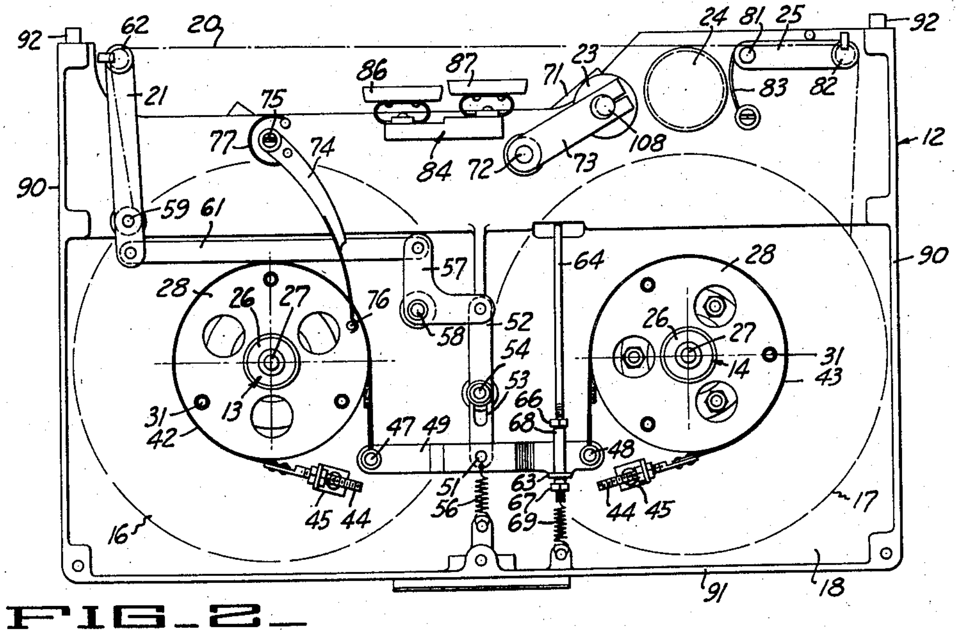
Figure 2 is a plan view of the magazine by itself, with the supply and takeup reels indicated in dotted lines.

Figure 2 illustrates the brake bands 42 and 43 for the individual brake drums. Each band can consist of a strip of thin spring metal, with a liner of suitable material such as asbestos fiber. One end of each band is provided with an adjustable anchorage to the frame of the magazine. Thus in each instance one end of the band is attached to a threaded rod 44, which is adjustably secured by nuts to a mounting bracket 45. The free ends of the brake bands are secured by pins 47 and 48 to the ends of the cross connecting bar 49. This bar has its center pivotally attached by pin 51 to one end of the link 52. A slot 53 in this link is engaged by the fixed guide pin 54, whereby the link is restrained to move generally in a direction at right angles to the length of the bar (Figure 2). The center of bar 49 is also connected to a tension spring 56 whereby the bar is urged in a direction to contract or tighten both the bands 42 and 43 about the brake drums.

The bar 49 has an operative connection with the constant tension arm 21. Thus an L-crank 57 is secured by the pivot 58 on the frame of the magazine, and its one arm has a pivotal connection with the link 52. Arm 21 is pivoted at 59 to the frame of the magazine, and the short end of this arm extending beyond the pivot pin 59, is connected to the other arm of L-crank 57, by the link 61. Thus when the arm 21 moves clockwise as viewed in Figure 2, L-crank 57 is turned counterclockwise, and the link 52 is moved to move the bar 49 in a direction to release both of the brake bands. As shown in Figures 1 and 2, the free end of arm 21 is provided with a stud or roller 62 for engaging the tape.

The bar 49 also has an operative connection with the capstan idler arm. Thus that end of the bar 49 which is nearest the turntable 43, is provided with a lug 63 which is apertured to slidably receive the rod 64. The rod is threaded to receive the nuts 66 and 67, and these nuts are spaced by the tube 68. The rod is urged in one direction by the tension spring 69. The rod 64 passes through the frame or housing of the magazine (Figure 3) and is attached to an arm 71. This arm is secured to a shaft 72, which also serves as the pivotal mounting for the idler arm 73 that mounts the idler 23. Suitable means (not shown) serves to operate the arm 71 together with the idler arm 73, to position the stop nut 66 in a particular relationship with respect to the lug 63. More particularly, the relationship is such that when the roller 23 is retracted from the capstan, there is a retracted relationship or a spacing between the lug 63 and the nut 67 as shown in Figure 2, thus permitting movements of the bar 49 in response to movements of the link 52, to control the release and engagement of both brake bands. However, when the roller 23 is engaged with the capstan, the lug 63 is brought into engagement with nut 67, thereby releasing the brake band 43 which is associated with this turntable.

Means are provided for indicating the amount of tape remaining upon the supply reel. Thus an arm 74 is pivotally mounted at 75 to the frame of the magazine, and has its free end 76 disposed to ride upon the tape. A spring 77 serves to urge the arm in a clockwise direction as viewed in Figure 1, whereby the arm takes an angular position dependent upon the amount of tape upon the supply reel, but may be swung to an out of the way position when it is desired to apply or remove a supply reel. Shaft 75 can be connected with suitable indicating means (not shown) such as a potentiometer together with a bridge type indicating circuit.

The safety switch arm 25 is pivoted at 81 to the magazine frame, and carries a tape engaging roller or stud 82 at its free end. As viewed in Figure 1, it is urged to rotate in a counterclockwise direction by the spring 83. When engaged by the tape the arm 25 is held in the position shown in Figure 1. However, in the event of tape breakage, arm 25 is permitted to swing in a counterclockwise direction as viewed in Figure 1, whereby it engages switch means (not shown) which in turn deenergizes the machine.

The magazine may also carry an assembly 84 which includes spring pressed metal covers 86 and 87 for shielding the playback and record heads.

Normally the magnetic tape 20 is threaded in the manner shown in Figure 1. Thus, it extends from the supply reel 16 over the free end of the tension arm 21, then across the head assembly 22, to the driving capstan 19. From the driving capstan it extends over the guide roller 24, over the free end of the safety switch arm 25, and then to the takeup reel 17. When a magazine is withdrawn from the machine, the tape extends directly between the free end of arm 21 and the guide roller 24.

The top or mounting plate 11 can be the top of a housing or frame serving to enclose other working parts, such as motors, electronic amplifiers and the like. To facilitate application of a magazine, and to accurately locate the magazine with respect to cooperating parts carried by the top plate, the side edges of the top plate are provided with the parallel horizontal seating rails 88. These rails are adapted to be engaged by the parallel guide edges 89, Figure 3, that are attached to the lower side of the magazine. The frame or housing of the magazine is provided with the side and front walls 90 and 91 (Figure 1), and the rear edges of the walls 90 carry the adjustable positioning studs 92. These studs are adapted to engage abutment shoulders 93 (Figure 1) that are formed on the positioning blocks 94. Blocks 94 are also provided with hold down lugs 95, which serve to hold the rear portion of the magazine down upon the top plate, when the magazine is slid to its final operating position.

In normal practice the magazine frame is also provided with a cover plate, which is attached to the side and front walls 90 and 91. In addition, the housing with which the top plate 11 is associated can be provided with a cover which can be swung down over the top of the magazine, after the magazine has been placed in its operating position.

Figure 3:
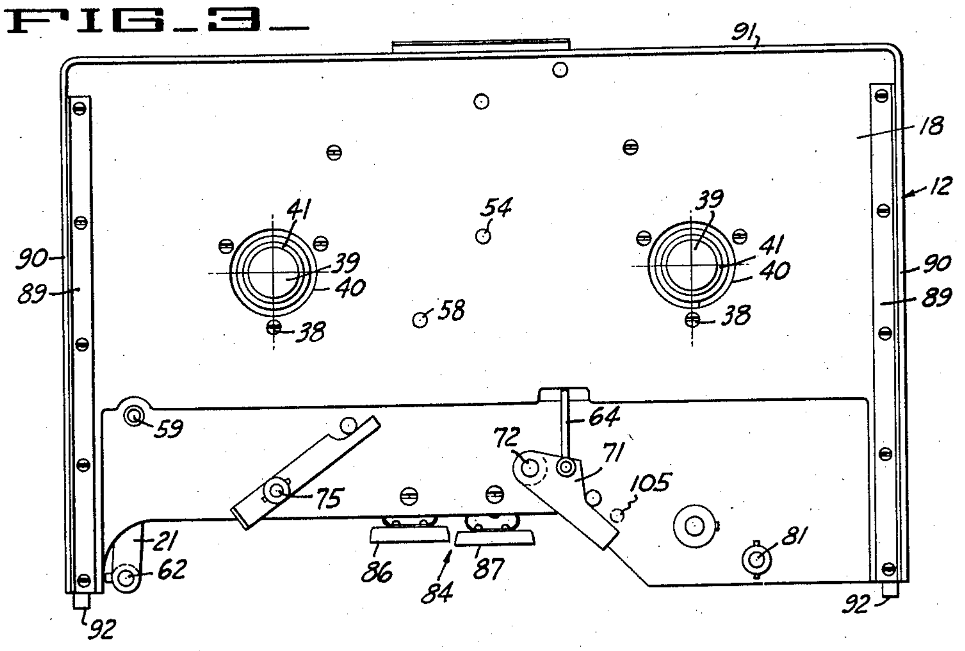
Figure 3 is a bottom plan view of the magazine shown in Figure 2.
Figure 4:
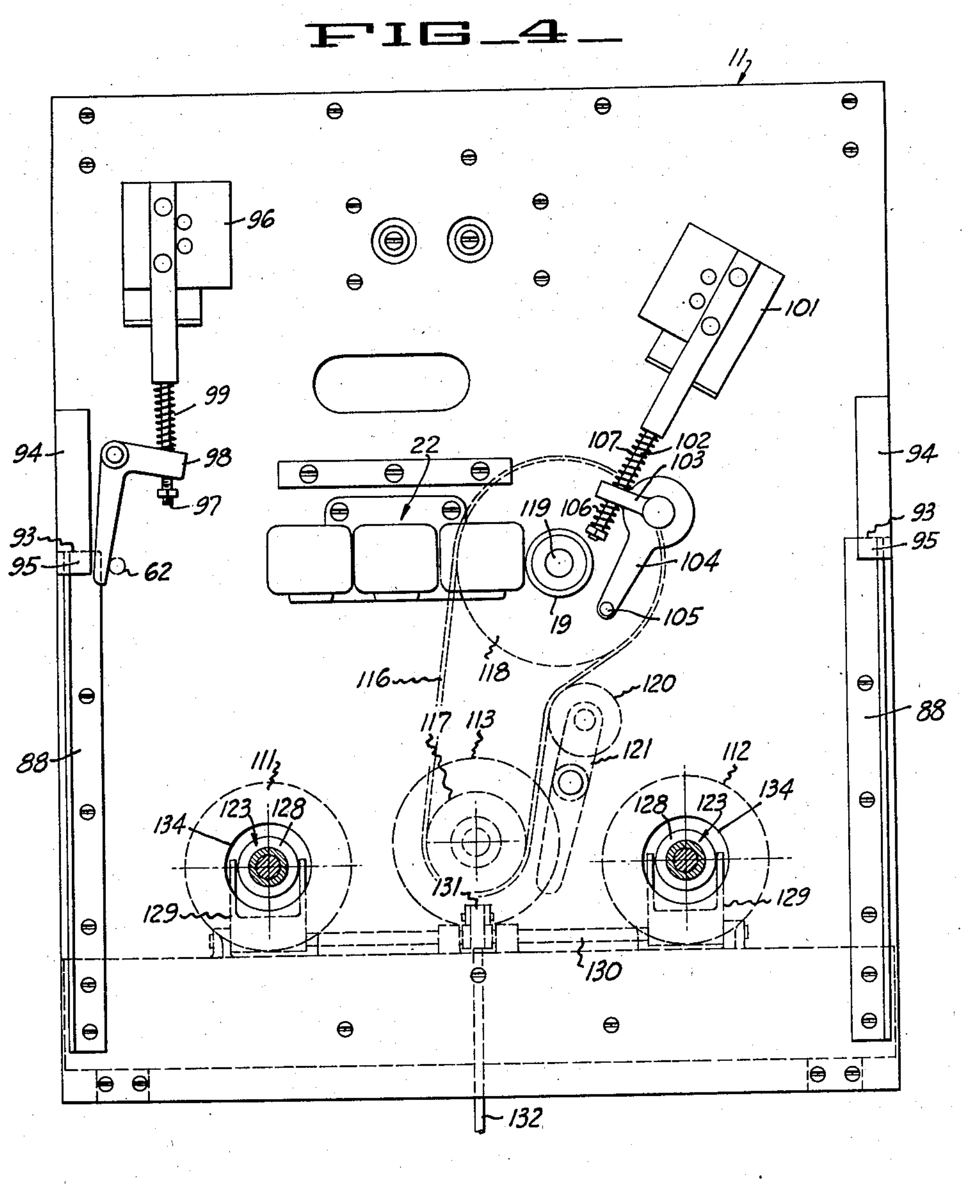
Figure 4 is a plan view similar to Figure 1, but with the magazine removed and showing parts in section.

Figure 1 illustrates some additional operating parts carried by the top plate 11. Thus, a solenoid 96 is provided which has its operating rod 97 attached to one arm of the L-crank 98. The other arm of this L-crank is disposed to engage and swing the tape tension release arm 21 in a clockwise direction as viewed in Figure 1, when the solenoid 96 is energized. Normally, the L-crank 98 is retained in an out of the way position with respect to the tension arm 21, by the compression spring 99. An additional solenoid 101 is arranged to operate the capstan idler arm 73. Thus as shown in Figure 4 the operating member 102 of this solenoid connects to an arm 103 which in turn is attached to the pivotal arm 104. The free end of arm 104 carries a pin 105, which is normally positioned alongside the arm 71 (Figure 3). Thus when solenoid 101 is energized, arm 71 is moved in a direction to urge the capstan roller 23 against the capstan. Compression springs 106 and 107 about the rod 102 provide a yieldable connection with the arm 103, thus providing the desired degree of pressure between the idler roller and the capstan. In addition, this pressure can be controlled by adjusting an eccentric mounting 108 for the idler roller upon the arm 73.

Figure 5:
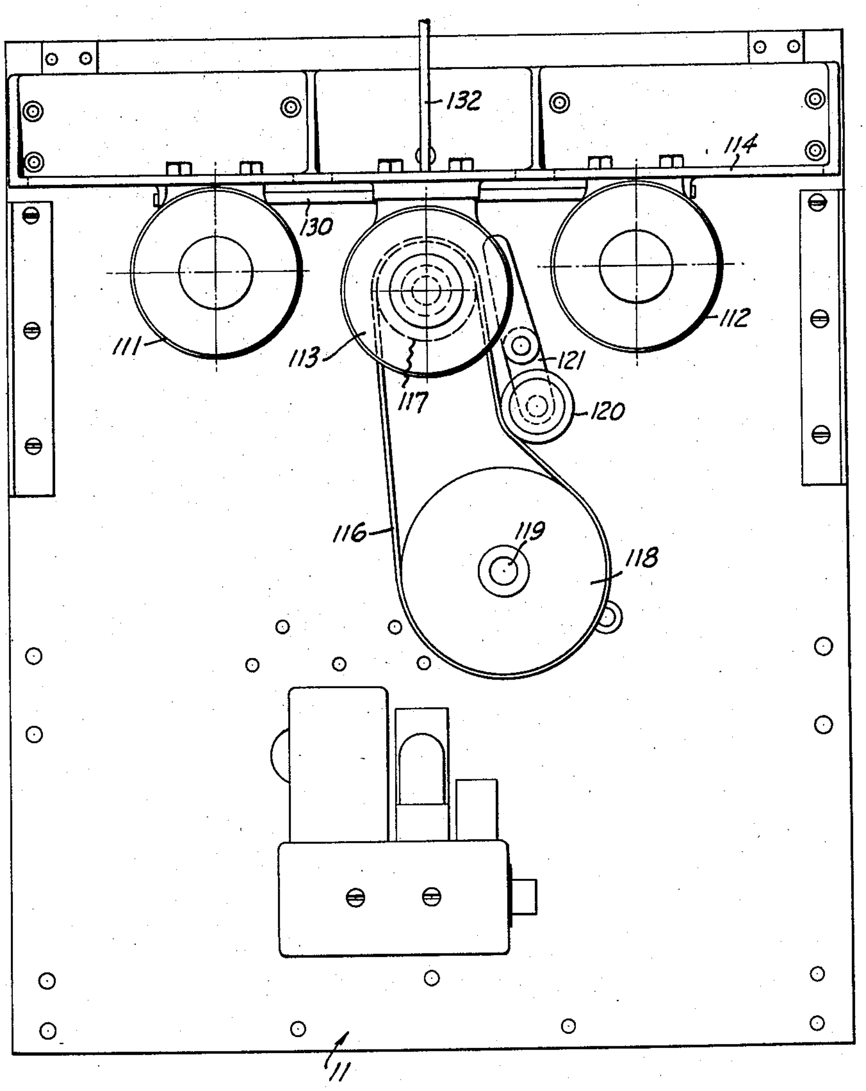
Figure 5 is a bottom plan view of the top mounting plate for the machine.

As shown in Figure 5, the motors employed can include the motors 111 and 112, and the capstan drive motor 113. All of these motors can be carried by the vertical wall 114 which extends downwardly from the top plate. The drive connection between the motor 113 and the shaft of the capstan 19, can consist of a belt 116, which engages a drive pulley 117 on the motor 113 and a pulley 118 secured to the capstan shaft 119. An idler pulley 120 carried by the spring pressed arm 121, provides constant belt tension.

Figure 6 illustrates the coupling means employed for coupling the motors 111 and 112 to the shafts 27 of the turntables. The same coupling means is used for each motor and consists of a clutching assembly 123 engageable with the resilient O-ring 41 of the associated turntable. As illustrated in Figure 6, each assembly consists of a disk 124 which is mounted upon the motor shaft, and which carries the circumferentially spaced driving pins 125. The pins 125 have slidable driving engagement with the collar 126, and by means of springs (not shown) the collar is yieldably urged in a direction away from the disk 124. Collar 126 carries a concentric driving cone 127, which is dimensioned to frictionally engage about the resilient O-ring 41. A shift collar 128 is journalled to the collar 126, and is engaged by the shift fork 129. Both of the shift forks 129 for the clutching assemblies are attached to the horizontal shaft 130, and this shaft carries an operating arm 131. An operating link or rod 132 connects to the free end of arm 131, and extends to manual or automatic operating means. The top plate 11 is provided with an opening 134 to accommodate each of the clutching members 123, whereby when these members are retracted, they are well below the level of the frame 18 of the magazine 12, thus permitting the magazine to be removed or introduced as desired.

Operation of the apparatus described above is as follows: A magazine is loaded with supply and takeup reels, and the magnetic tape threaded in the manner previously described. When it is desired to apply the magazine to the machine it is engaged with the rails 88, and then slid horizontally until its rear edge is engaged by the blocks 94. This serves to properly locate the magazine for bringing the various working parts into working alinement. The cover of the machine (not shown) can now be swung down upon the top of the magazine. While the magazine is being applied, the rod 132 is positioned whereby the conical clutching members 127 are retracted. However, after the magazine has been positioned the rod 132 is released, whereby the clutching members are projected into frictional engagement with the resilient O-rings 41. The two motors 111 and 112 are now operatively engaged with the turntables which in turn carry the supply and takeup reels. In conjunction with introducing the magazine, the part of the tape spanning between the tension arm 21 and the roller 24, is automatically brought into cooperative relationship with the magnetic head assembly 22, so that the machine is ready for recording or playback operations. Assuming that it is desired to record, the motors are energized whereby the motor 111 applies torque to its associated turntable to maintain an optimum tension upon the supply tape. The capstan motor 113 drives the capstan 19 at a constant speed, thus causing the tape to be drawn across the magnetic head assembly at the desired speed for recording. Solenoid 101 is energized whereby the capstan idler roller 23 urges the tape against the periphery of the capstan. Motor 112 applies sufficient torque to its associated turntable to wind the tape upon the takeup reel. The tension upon the tape extending from the supply reel to the capstan serves to apply turning torque to the arm 21, and this in turn determines the positioning of the braking means. At this time the lug 63 and the abutment 67 are in engagement whereby only the tension of brake band for the supply reel is under the control of arm 21. The brake band for the supply turntable is self-energizing for clockwise or unwinding rotation, as viewed in Figure 2. On the contrary, the takeup turntable as viewed in Figure 2, is self-energizing for a counterclockwise rotation, and self-relieving for clockwise rotation. It will be evident therefore that under the normal recording conditions just assumed, a positioning of the tension arm 21 under the tape tension tends to regulate the braking means for the supply reel.

At the end of a recording operation it is generally desirable to rewind the tape upon the supply reel, before a playback operation, or before removing the magazine from the machine. Upon conditioning the machine for a rewind operation, the solenoid 101 is deenergized whereby the capstan idler pulley 23 is retracted from the capstan, and the rod 64 moved downwardly as viewed in Figure 2, to provide a spacing between the lug 63 and stop nut 67. This serves to place both the brake bands under the control of the bar 49. At the same time the motor 111 is energized to rotate the supply reel in a reverse direction at an accelerated rate, and the solenoid 96 is energized to swing the tension arm 21 sufficiently far to release both the brake bands. The two turntables are now free to rotate at a relatively high speed to wind the tape upon the supply reel. At the end of such rewinding operation the solenoid 96 is deenergized to apply the brakes to the two turntables, and at the same time the motor 111 is denergized. The braking means associated with the right hand turntable as viewed in Figure 2 tends to be greater after such a rewind operation, than the brake associated with the left hand or supply turntable. This is desirable in that it makes for rapid stoppage of the two turntables, without introducing slack into the tape. The same operation, as in rewind, can be obtained when it is desired to energize the motor 112 to obtain accelerated or forward movement of the tape.

It is evident from the foregoing that I have provided a magazine type of magnetic tape machine having many desirable characteristics. The supply and takeup reels and also the turntables for these reels, form a part of the apparatus. The magazine also carries braking means together with operating means for the brakes which is automatically coordinated with cooperative parts carried by the main part of the apparatus. When a magazine is introduced into the machine, the tape automatically properly positioned with respect to the magnetic head assembly. Therefore, magazines can be introduced or replaced in a minimum amount of time. After a particular magazine has been used it can be removed and stored leaving the apparatus free for use with additional magazines. In other words, one may utilize a number of magazines with one apparatus, thus permitting recording and playback operations upon the several magazines as desired.

I claim:

1. In a magnetic tape apparatus, a magazine comprising a frame, shafts journaled on said frame, turntables mounted on said shafts and engaging supply and take-up reels, discs mounted on said shafts, drive rings carried by said discs, tape guiding means carried by the magazine frame, said guiding means including a movable tension arm, brake drums attached to said turntables, brake bands engaging said drums, said brake bands controlled by movement of the tension arm, a main frame having magazine positioning means thereon, a tape driving capstan carried by said main frame, a capstan idler movably carried by the magazine frame, said idler urging the tape into driving relation with respect to the capstan, means carried by the main frame serving to actuate the idler into engaged and retracted position relative to the capstan, means carried by the magazine frame serving to release the take-up turntable brake responsive to movement of the idler into engaged position with the driving capstan, motor means carried by the main frame, said motor means including driving shafts, driving cones driven by said shafts, and means for detachably coupling said cones to the drive rings of a magazine disposed upon said main frame.

2. A magnetic tape apparatus, a pair of turntables adapted to engage magnetic tape supply and take-up reels, capstan means for driving the magnetic tape extending between the reels, motive means for driving the turntables, a brake drum attached to each turntable, brake bands engaging the drums, means forming a fixed anchorage for one end of each band, a bar having its ends attached to the other ends of the bands, said bands being self-energizing for opposite directions of rotation of the turntables, spring means for urging the bar in a direction to apply braking torque to both drums, means attached to the center of the bar for moving the bar to effect the release of both brake bands for a rewind operation, additional means engaging that end portion of the bar adjacent the take-up reel for releasing the band associated with the take-up turntable, an idler movable to a position in which it presses the tape against the driving capstan and to a retracted position with respect to the capstan, means for moving said idler between driving and retracted position, means forming a connection between said last named means and said additional means, whereby when said idler is in tape engaging position the brake band engaging the take-up reel brake drum is released, a tension arm adjacent said supply reel and engaging the tape extending therefrom, and means connected between said arm and the center of said bar, whereby the braking torque applied to the supply reel is varied to maintain the tension on the tape constant.

3. In magnetic tape apparatus, a pair of turntables adapted to receive magnetic tape supply and takeup reels, capstan means for driving magnetic tape extending between the reels, motive means for driving the turntables, a brake drum attached to each turntable, brake bands engaging the drums, means forming a fixed anchorage for one end of each of the bands, a bar having its ends directly attached to the other ends of the bands, said bands being self energizing for opposite directions of rotation of the turntables, spring means for urging the entire bar in a direction lateral of its length to apply braking torque to both of the drums, means attached to the center of the bar for moving said center and the bar in a direction lateral of its length against such spring tension to effect release of both of the brake bands for a rewind operation, an additional means engaging that end portion of the bar connected to that brake band which is associated with the takeup turntable for releasing the same, an idler movable to a position in which it presses the tape against the driving capstan and to a retracted position with respect to the capstan, means for moving said idler between said driving and retracted positions, and means forming a connection between said last means and said additional means, whereby when said idler is in said tape pressing position the brake band engaging the takeup reel brake drum is released.

4. In magnetic tape apparatus, a pair of rotatable reel carrying devices adapted to receive magnetic tape supply and takeup reels, a capstan means for driving magnetic tape extending between the reels, motive means for driving the reel carrying devices, a brake drum attached to each such device, brake bands engaging the drums, means forming an anchorage for one end of each of the bands, a rigid member having separate connections to the other ends of the bands, said bands being self energizing for opposite directions of rotation of the turntables, spring means for urging the entire rigid member in a direction simultaneously to apply braking torque to both of the drums, means for moving said member in a direction against such spring tension simultaneously to effect release of both of the brake bands for rewind operation, an additional means to release selectively the brake band associated with the takeup reel, an idler movable to a position in which it presses the tape against the driving capstan and to a retracted position with respect to the capstan, means for moving said idler between said driving and retracted positions, and means forming a connection between said last means and said additional means whereby when said idler is in said tape pressing position, the brake band engaging the takeup reel brake drum is selectively released.

References Cited in the file of this patent

UNITED STATES PATENTS

| | | |
|---|---|---|
| 565,656 | Wyman | Aug. 11, 1896 |
| 1,336,000 | Sturt | Apr. 6, 1920 |
| 1,345,327 | Mason | June 29, 1920 |
| 2,097,592 | Gibbs | Nov. 2, 1937 |
| 2,438,222 | Lear | Mar. 23, 1948 |
| 2,457,699 | Marsen | Dec. 28, 1948 |
| 2,632,060 | Foote et al. | Mar. 17, 1953 |
| 2,661,162 | Owens | Dec. 1, 1953 |